Figure 3:
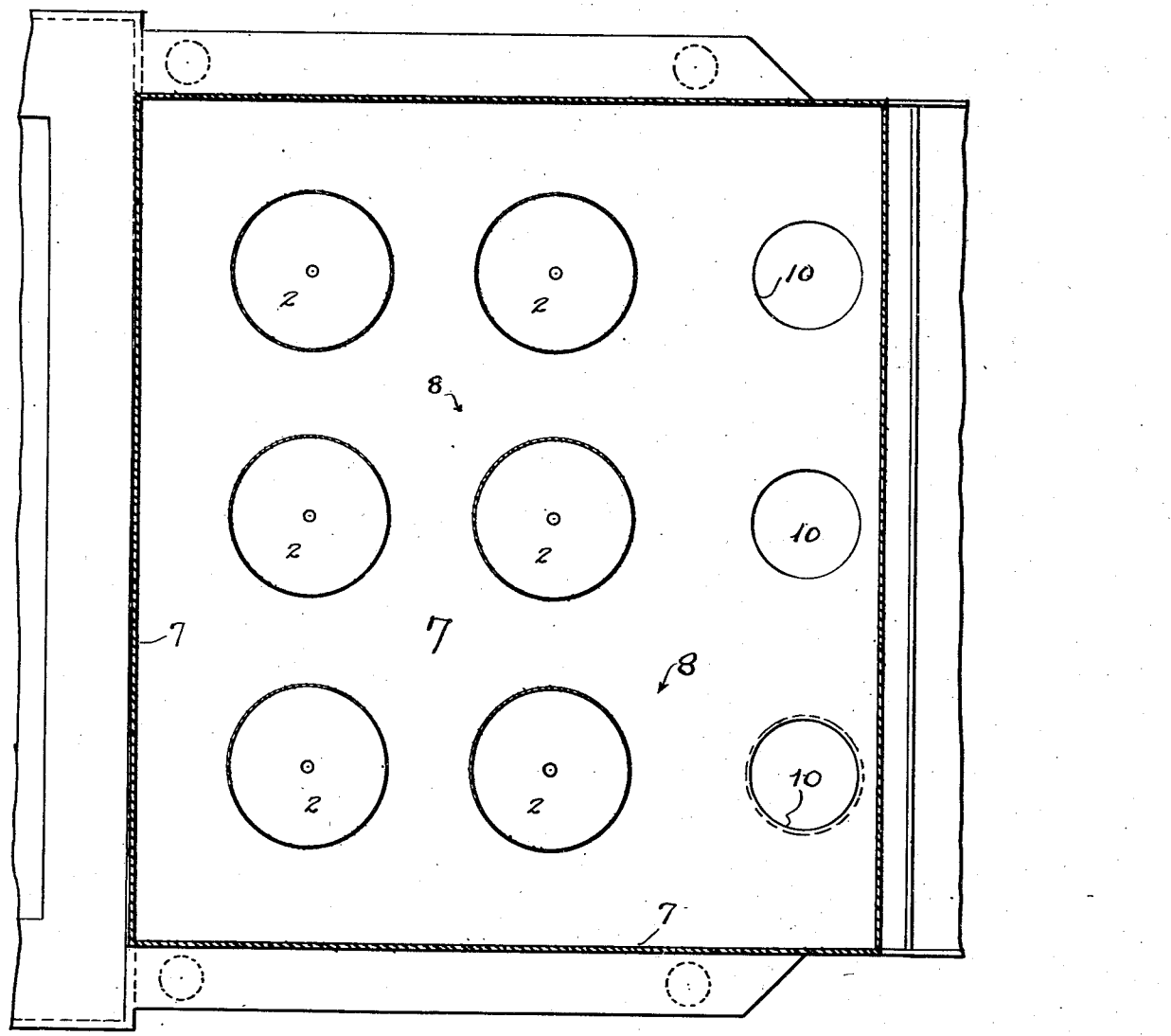

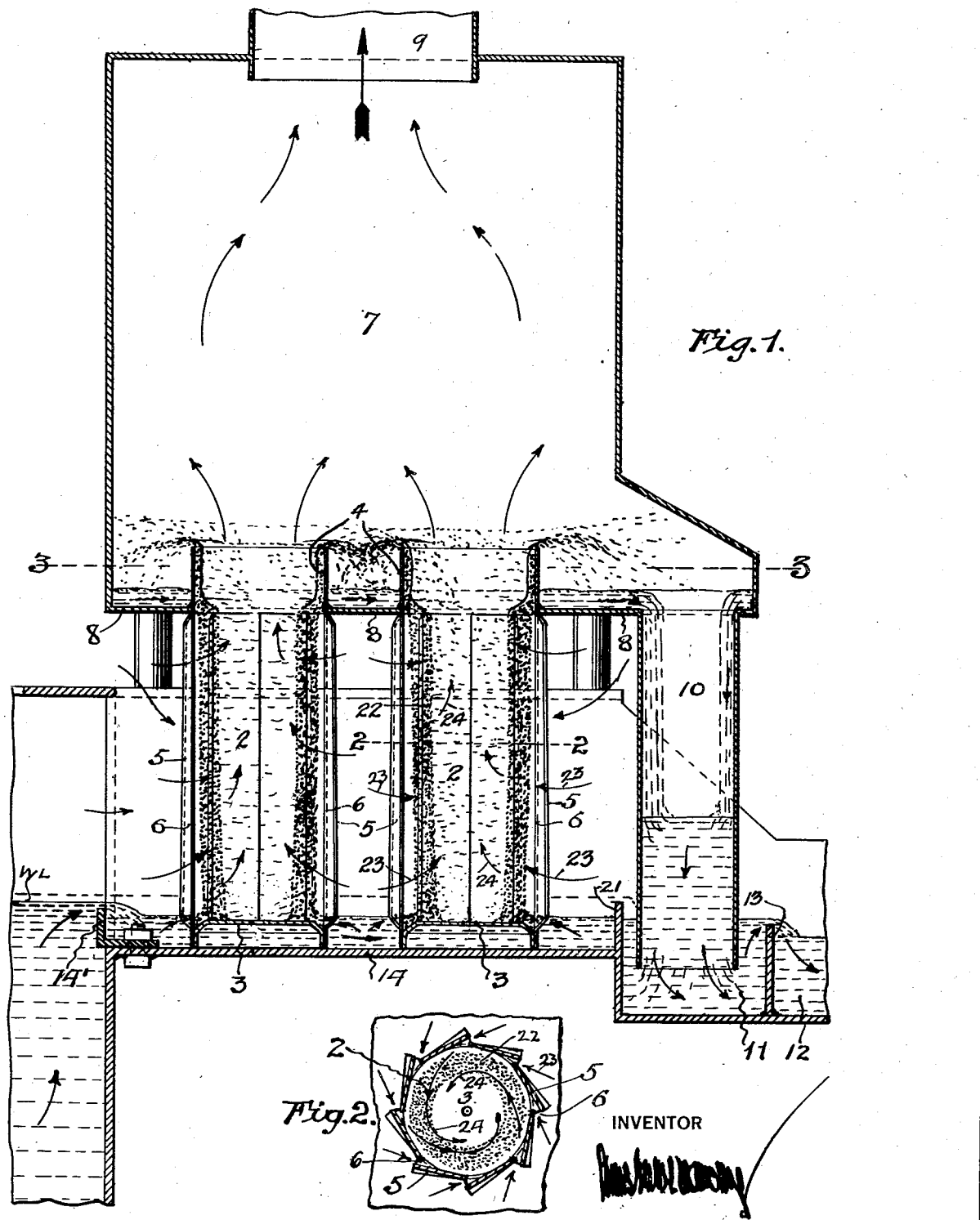

May 5, 1942.     C. G. HAWLEY     2,282,225
SEWAGE STABILIZER
Filed Sept. 17, 1937     4 Sheets—Sheet 3

INVENTOR

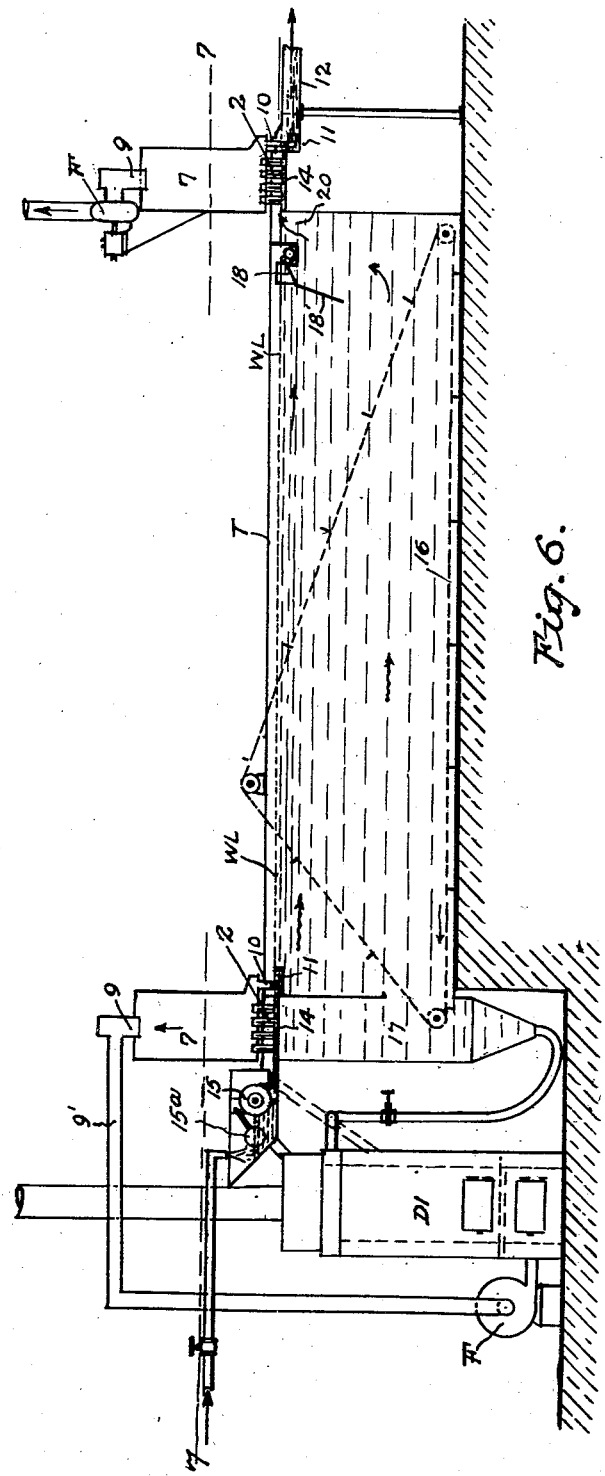
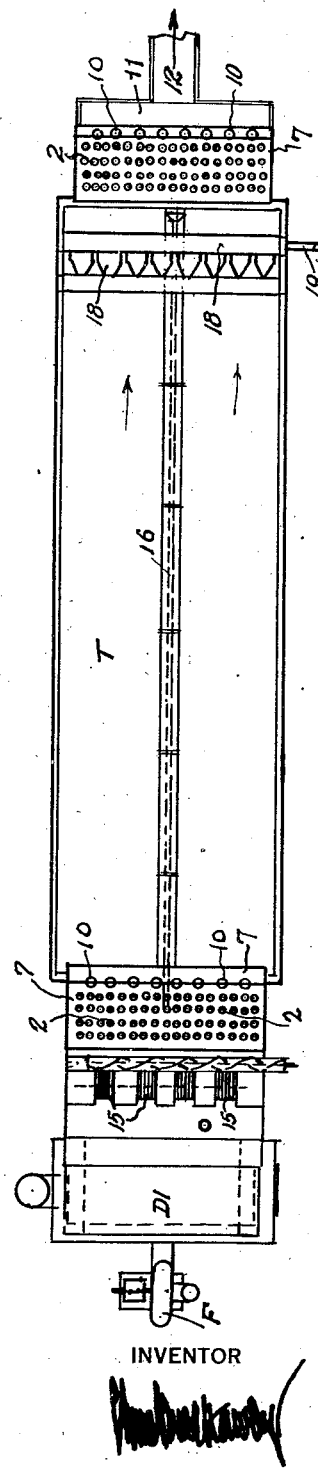
Fig. 6.
Fig. 7.

UNITED STATES PATENT OFFICE 2,282,225

SEWAGE STABILIZER

Charles Gilbert Hawley, Chicago, Ill.; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application September 17, 1937, Serial No. 164,367

1 Claim. (Cl. 210—2)

This invention has to do with liquids which tend to putrefy; a designation which includes sewage and like organically polluted waters not containing or supplied with enough oxygen to prevent putrefaction.

Two main objects are to be accomplished by the treatment of sewage; to wit, the elimination of disease-producing bacteria to the extent demanded by local health conditions; and the disposal of sewage without producing nuisance or odor or endangering health.

In practice, the sewage is not destroyed nor is its complete purification attempted. Instead, such wastes, in various states of purification, are ultimately diffused in larger bodies of natural water, termed diluting water, in expectation of final or at least adequate purification through the action of the oxygen contained by the diluting water. Heretofore expected results have rarely been attained. The limitations of treating systems are recorded in failure to promptly separate scums and settleable solids and to provide for adequate oxidation of colloidal and dissolved matters; and usually, pathogenic germs or organisms remain, making terminal chlorination a necessity.

In contrast, the demand is for a system of treatment capable of producing sewage which may be mixed with natural water to the advantage of the latter and its banks and certainly without injury to aquatic organisms which are valuable for use and/or which normally assist in water purification.

Clearly, procedure by dilution of raw sewage or of only partially purified sewage involves a depletion of oxygen not easy to replace, and it is obvious that it would be better if the diluting water were not called upon for assistance in sewage purification. Hence the constant effort to lessen the oxygen tax upon natural bodies of water; as by removing settleable impurities before discharging sewage into diluting waters; and in some cases, by protracted aeration and an active propagation of non-pathogenic organisms which aid in harmlessly reducing organic impurities to stable forms; all such procedures serving to lessen the overall putrecibility of the sewage and its oxygen demand upon the diluting waters.

Present day practices more or less effectively condition sewage, in advance of dilution, but in none is even approximately permanent stability attained and the best still ultimate in demands upon the diluting waters, usually failing to provide for the complete oxidation of colloidal and dissolved sewage solids.

Maintenance of healthful conditions in diluting waters is most important and to minimize that duty the separation and removal of settleable solids and scums is always desirable, before the thus improved sewage leaves the land. And if solids and scums are removed upon land they should be disposed of upon land and in manner to avoid nuisance, odors and health dangers. Such removed matters being unstable, should not be mixed with earth upon which foods are produced, but should be burned. Next, the oxygen required for the ultimate disposal of sewage may be added and employed long in advance of sewage discharge or at the moment of such discharge; and if adequate in amount, will serve to obviate the abstraction of oxygen from the diluting water. These are basic principles of the present invention.

A primary object of sewage treatment is to make the same non-putrecible; that is stable, and safe for admixture with natural bodies of water, which waters are valuable for the aquatic organisms supported thereby or from which supplies are drawn for domestic use.

The discovery now to be reported is, that while the solubility of oxygen in water is ordinarily regarded as limited to a few parts per million, varying with temperature, it is in fact possible, by operations about to be described, to imprison in even very foul water enough air to provide in advance for the firm stabilization thereof and thus afford ample time and means for the chemical and/or the bio-chemical destructive reduction of contained organic matters; thereby protecting any diluting water with which such aerated sewage is admixed; and if desired, even increasing its oxygen content. Obviously it may be difficult to prove a measurable increase but for all practical purposes this statement is sound. A great range of aeration is here provided and whether or not the process shall be carried through to completeness may be freely determined to accord with local sanitary conditions and economic circumstances.

A further discovery hereof is that by a brief atomization of sewage and the use of air in swift motion therethrough it is possible to displace and blow out of sewage, quantities of dissolved, imprisoned or entrained gases, vapors and light organic structures; which, if allowed to remain would militate against prompt and healthful disposal of the main load of organic matters. Next, by abruptly terminating such atomization (restoring the liquid to mass formation) it is possible to charge the purged or air scrubbed sewage with air in relatively large volume and in the state of minute particles or globules which the massed water thereafter holds in relatively firm imprisonment, suspension or solution, and hence ready for combination with therein adjacent organic matters. These concurrently sequential operations effectively stabilize the sewage; and comprise the gist of the present invention.

The invention hereof comprehends the employment of these discoveries and operations in specially invented apparatus (as hereinafter described and claimed) wherein and whereby they are performed quickly and so inexpensively (counting initial and operating costs) that proper sewage treatment may now become common; having regard for public expense as well as the requirements of health and comfort.

Whether the effluents from these sewage treatment plants shall be turbid but harmless, or clean, sparkling and harmless, depends merely upon the time and cost rates at which sewage is treated hereunder. In this regard it is to be remarked that a turbidity, due merely to the presence of inorganic solids is unobjectionable; likewise turbidity due to minute organic matters, so long as the latter are accompanied by adequate oxygen as here described.

A very important function of the operations described resides in the disengagement of oils and soapy and fatty matters, permitting them to be easily skimmed from the sewage stream, prior to dilution. Ordinarily such matters yield to treatment very slowly and are difficult to get rid of.

It is important to note that the described pulverization of water and air, appears to explain the pronounced extermination of protozoa, and anaerobic and facultative bacteria, as observed in this operation. Apparently the presence of ample oxygen and the swift change from tensional imprisonment within the water, to sudden freedom upon the surfaces of the water particles, has the effect of bursting or destroying the fragile cells of protozoa, and pathogenic bacteria. On the other hand, the more minute aerobic bacteria in considerable measure escape destruction and may be discharged with the aerated water, thereafter to play their proper part in water purification.

Another advantage hereinafter enlarged upon relates to the use of ultra-violet rays for the complete annihilation of bacteria. As well known, the effect of the ultra-violet ray is limited virtually to the surface upon which it impinges. Under the present invention the superficial area of the liquid is tremendously increased and every particle is directly exposed for such treatment.

Speaking further of the present invention, it may be said to comprise or include the purging and enforced aeration of sewage and the like; and, in contrast with former methods of aerating water en masse, it consists in performing the operations in space and in a state of fine pulverization within a restricted passage, immediately followed by consolidation of the liquid.

More specifically, the invention resides in employing air in swift whirling motion and close confinement within a restricted passage, using the air for the continuous whirling pulverization or atomization of the liquid and using the whirling pulverized liquid as the avenue through which the air must pass, thereby exposing and expelling unwanted matters from the liquid, and progressively and centrifugally massing the liquid, thereby imprisoning air therein, prior to discharge from restraint.

In practice, the aforesaid restricted passage for the air and water best comprises a so-called centrifugal tuyère or unit, closed at the bottom, open at the top, and characterized by a plurality of tangential air entrance tuyères, topped by an imperforate cylindrical section wherein occurs the described consolidation of liquid and imprisonment of air.

The description thus far has been limited to the treatment of heavily polluted water. It is here pointed out that water for human consumption may be likewise treated and markedly improved, from the standpoints of palatability, odor, sterility and protracted stability.

Both discovery and invention will be more clearly understood upon reference to the accompanying exemplary drawings and description, which explain the foregoing and other components of the invention.

Figure 4:
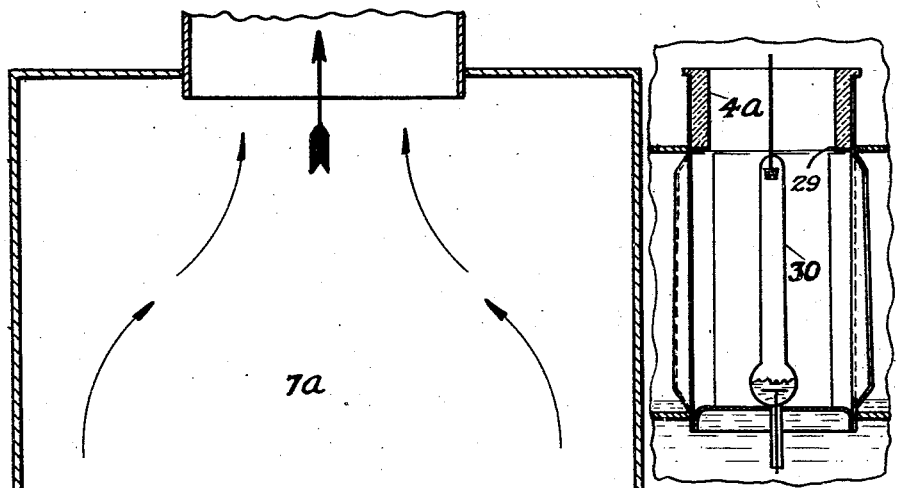
Figure 5:
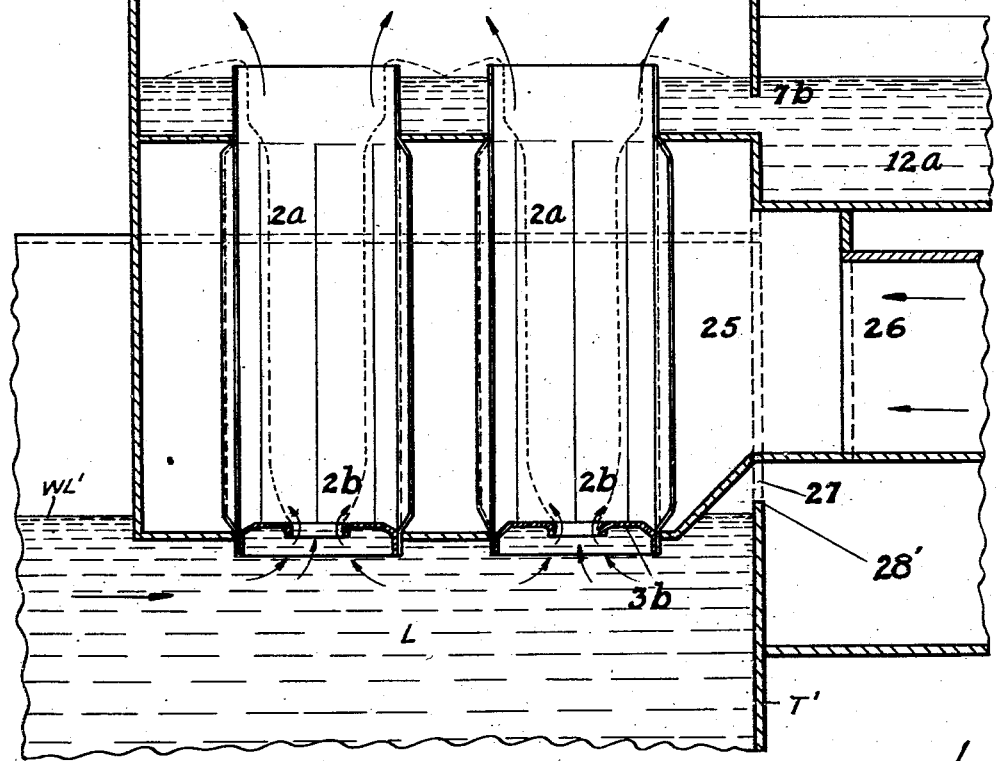

In said drawings Fig. 1 is a vertical cross section of a sewage stabilizer embodying the present invention and diagrammatically illustrating the operation thereof under air suction conditions; Fig. 2 is a horizontal section of a single centrifugal tuyère or unit, on the line 2—2 of Fig. 1; Fig. 3 is a horizontal section on the line 3—3 of Fig. 1; Fig. 4 is a vertical sectional view of a tuyère or unit of slightly modified form and disclosing an ultra violet lamp which may be used for the annihilation of bacteria exposed in the tuyère by the operation described; Fig. 5 is like unto Fig. 1 but illustrates the apparatus as modified for pressure air operation; Fig. 6 is a diagrammatic sectional elevation of a sewage treatment system of novel design, more completely embodying the invention; and Fig. 7 is a plan view taken from Fig. 6.

The apparatus shown in Figs. 1, 2 and 3 comprises the so-called "stabilizer" of this invention. It is of a multiple type, being characterized by a plurality of centrifugal units or tuyères, marked 2, constructed and functioning as previously described. That is, each tuyère is of generally cylindrical form, with a closed bottom 3 and an imperforate cylindrical top portion 4, which parts are joined by a plurality of tangential blades 5; the latter forming an equal number of slot-like tangential tuyère openings 6. The combined area of these openings closely approximates that of the open top of the tuyère. However, this ratio may be varied as required to suit differing conditions. The arrangement of blades and openings is clearly shown in Figs. 1 and 2.

As a guide to others, it is explained that the tuyères here shown are of half normal size, actually being 2½ inches in diameter and 7½ inches tall.

The stabilizing effects reported were secured by using just such tuyères. Each such tuyère raises and delivers from a lower level 2 to 4 gallons of sewage per minute, depending upon the rate at which air is passed through the tuyère openings. And importantly, in the case of the tuyères shown, these liquid rates are indexed by respective pressure drops of 2 and 4 inches of water; the difference between the pressure of air entering the tuyère and that of the air leaving the same. Obviously little power is or need be expended in performing the hereinbefore described purging and stabilizing operations.

Greater water deliveries for the same pressure drop may be secured by lessening the tuyère height; a statement which makes it clear that further power may be conserved, provided other conditions permit a less protracted working of the liquid. Likewise with tuyères of any given design the power and delivery rates may be varied within wide range, always having in view first costs and the effects required.

Notwithstanding these specifications of size and capacity it is to be understood that the invention is not limited thereto, for as indicated the stabilizer tuyères may partake of all the various dimensions and proportions best calculated to produce the results desired with minimum expenditures of power.

The box or chamber 7 is provided for the reception of liquid and air from the tuyères 2. It has openings in its floor 8, wherein the upper ends of said tuyères are fastened, leaving the parts 4 thereof standing above the floor and thus converting the lower part of the box 7 into a reservoir for the reception of the liquid received from the tuyères.

As shown, the box 7 is relatively large in relation to the combined discharge areas of the tuyères and amply large to permit quick settlement therein of the liberated liquid. Residual air, containing gases, and other matters purged from the liquid as before explained, passes off through an opening or openings 9 at the top of the box.

The box floor 8 has other openings from which depend tubes or ducts 10, through which the elevated and aerated liquid is discharged from the box.

The apparatus of Fig. 1 operates under partial vacuum (preferably created by a centrifugal fan F, as shown in Figs. 6 and 7) and for the maintenance thereof air should be prevented from entering through the drain tubes 10. Hence, as shown, the lower ends of those tubes are submerged or sealed in liquid, the latter being held in a cross trough 11, into which the tubes discharge the liquid from the box 7. The aerated liquid leaves that trough over an outfall weir 13, and passes onward toward dilution, as by way of an outfall duct 12.

In order that liquid may enter the tuyères to be atomized and elevated, as described, it is necessary that it shall be supplied to the lower parts thereof and therefore arrangements are made to flood said lower parts to a level slightly above the tuyère bottoms 3; and to keep that level substantially constant, though it admits of considerable variation.

To such ends, the box and tuyères are suitably supported in a manner to allow the lower ends of the tuyères to dip beneath the surface of the stream of sewage or other liquid to be so treated. The space between said surface and the box is open, so that air may freely enter the tuyères through the many tangential tuyère openings thereof.

Obviously, the stabilizer may be thus positioned in and above any part of a sewage stream. But as these stabilizers are usually associated with sedimentation tanks, such as the tank T, shown in Figs. 6 and 7, it is best to prevent tank disturbances by the swift entrance of air and liquid into the tuyères; and most conveniently, the stream is formed and maintained in a shallow pan 14, really a shallow duct, arranged beneath the tuyères 2. The liquid is taken from the pan 14 and atomized as rapidly as it reaches the tuyères. Any suitable means may be employed to provide and control the admission of liquid to this feed pan or trough 14.

As shown in Figs. 6 and 7, a stabilizer may be arranged at the reception end of a sedimentation tank T or may be arranged at the outfall end of that tank, as also there shown, or both arrangements may be employed. In the first named position, the pan 14 receives sewage from a sewage screen 15. For further information concerning said screen, reference may be made to applicant's prior application S. N. 120,792, filed January 15, 1937.

Through the use of a fine screen the sewage which reaches the tuyères 2 of the stabilizer is freed from particles large enough to clog those tuyères, and the sewage passing through the tuyères is uniformly atomized, purged and aerated and is then discharged into the cross trough 11, in or at the reception end of the tank T.

The cross trough 11 here functions as a distributor, assuring an even feed of sewage throughout the cross section of the tank T. Upon leaving the cross trough, the scums readily separate or collect upon the surface WL of the sewage in the tank, while the heavier aerated liquid constantly fills the tank and deposits solids while moving slowly forward therein.

Presently the disposition of the scums will be described.

By the action of the stabilizer, as before described, the raw sewage is dependably stabilized and cannot become septic. In consequence, even the settled sludge remains fresh, and the process thus affording absolute assurance against re-contamination of the sewage.

The settled solids accumulate in the bottom of the tank, which latter has the form of a trough, and are immediately, though slowly, discharged therefrom by the action of an endless drag chain 16, which operates to deposit the solids in the sludge pocket 17, the lower part of which is in open communication with the body of the tank. This quick removal of sludge also insures against re-contamination of the slowly clarifying sewage, as mentioned in aforesaid application.

Because of the small size of the solids passed by the screen 15, the sludge settles densely and, accompanied by less water than usual, is readily disposed of in a desiccating incinerator DI; as is true also of the screenings taken from the screen. Details concerning such parts and operations are also available in aforesaid earlier application.

Hereunder, special advantage is taken of the incinerator DI. Whatever its form, an incinerator includes a furnace and requires air to sustain combustion therein. When raw sewage is screened, purged and aerated as herein described, the exhausted air is likely to contain odorous constituents. If exhausted into the atmosphere these may at times be objectionable. As a definite preventative and to conserve the whole value of the exhausted air, this invention comprehends the employment of such polluted air in the incinerator, as represented by the piping 9', which leads from the top of the separator box 7 to the fan F, and thence into the lower part of the incinerator. A desirable closed cycle is thus provided and, as the incinerator DI operates without creating odors, the system as a whole can be freely used, even in densely populated areas.

Reverting to the scums, it will be seen that they progress on the surface WL, and near the outfall end of the tank, encounter a skimmer 18. The latter is as described and claimed in aforesaid application, and discharges the scum and a small quantity of water through an outfall pipe 19, thence to be gravity-separated and disposed of.

Progressively, the clarified sewage passes beneath and rises behind a cross baffle 18' and, as here shown, passes into a stabilizer pan 14, through an upflow space 20.

Referring again to Fig. 1, which illustrates a stabilizer for the outfall end of the tank, it will be seen that the weir strip 14', marking one end of the pan 14, governs the normal height WL of the liquid in a tank T, and the partially purified liquid falls over that strip 14' and into the pan 14, thence to be pumped or abstracted by the action of the air in stabilizer tuyères.

The tank level WL varies with the volume of sewage delivered to the tank and this variation may be so considerable as to occasion an overloading of the stabilizer tuyère unless the velocity of the air is correspondingly increased. Therefore, it is thought best to govern the maximum height to which liquid may rise in the pan 14, and this is done by providing the pan with an end strip 21, which is higher than the strip 14', and over which, on occasion, sewage may by-pass into the outfall trough 11.

At this point let it be said that the present invention comprehends the regulation of the air flow through the described tuyères in order that power shall be expended only in proportion to the strength and volume of the raw sewage which enters the system. This is done as follows.

As stated in aforesaid application, the speed and capacity of the rotary screen 15 are here automatically regulated by a mechanism which is controlled by the rise and fall of a float resting in the raw sewage approaching the screen. In Fig. 6 this float is marked 15$^a$. The requirements of the present invention are satisfied by a connection (electrical or mechanical) between that float and the regulator of the air moving motor which belongs to one or both of the described stabilizers. It is deemed unnecessary to herein better illustrate the complete regulating means.

The operation of the stabilizer tuyères is well depicted by Figs. 1 and 2 and particularly by the many dots 22 and by arrows 23 and 24. As best shown in Fig. 2, the air which forcibly enters the tangential tuyères 6 takes on a rapid whirling motion within the tuyère, as represented by arrows 24. Liquid entering through the lower parts of the tuyères 6 encounters the whirling air and is thereby immediately swept into rotation and disturbed and broken up to such an extent as to be finely atomized or pulverized, and in that state it progresses spirally to the imperforate top 4 of the tuyère.

At that point the rapidly whirling pulverized liquid inwardly displaced by the entering air and outward propelled centrifugal action is formed into a hollow cylindrical body, inwardly offset from the interior of the tuyère blades 5 and whirlingly maintained in space. Spiralling upward under the upward impulsion of the air, the liquid arrives at the top of the tuyère, and by centrifugal force is thrown outward against the imperforate part 4 and forcibly massed thereon.

Obviously, the air which enters the tuyère has only one avenue of escape and that is, through a foraminous wall of water, which the whirling air serves to maintain. It is equally apparent that in passing through that whirling wall, the air is finely subdivided therein and not only scrubs but also thoroughly impregnates the particles of water and is made ready for the described imprisonment in the liquid when the water is compacted against the imperforate cylindrical surface 4. Thus in continuous operation, the polluted water is purged and charged or re-charged with fresh air.

Arriving at the top of the imperforate part 4, the water whirls from the upper edge thereof and falls into the lower part of the air box or separator 7, hence to pass outward through the openings that lead from the bottom of the air box.

It is notable that the tuyères illustrated are of a length or height that exceeds the air pressure difference between the bladed exterior and the top of the tuyère. Yet a large volume of liquid is made to rise through the tuyère. This is explained by the fact that the superficial area, the sail area, of the liquid is here tremendously increased and the polluted water is easily swept upward by the moving air. In turn this explains the small consumption of power.

Another noticeable fact concerning this process is this: The colloidal matters contained by sewage are observed to be, in considerable measure, brought together or aggregated with one another and with larger sewage particles; and therefore settle more promptly in the sedimentation tank. This is explained by the forcible scrubbing together of the particles, as a part of the described centrifugal behavior of the air and water in the tuyères hereof, particularly those of small diameter.

It is believed that the principles, operations and the mechanical details paramount in this invention will now be thoroughly understood, and few modifications and qualifications thereof remain to be described.

The invention is not limited to the operation of this stabilizer under partial vacuum but is readily adapted for operation under positive pressure. Further, when so operated, the stabilizer is given the capacity of being able to discharge the aerated water at a higher level than that at which it receives the polluted water. This pressure operation is accomplished as shown in Fig. 5, wherein an air pressure box 25, is provided beneath the separator box 7a and contains the tuyères 2a. The box 25 receives air under slight pressure through a duct 26, the air whirling upward through the centrifugal tuyères and exhausting through the box 7a.

It will be noticed that the bottom of the pressure box 25 is closed, except that it contains openings in which the lower ends of the tuyère structures are fastened. The lower part of the pressure box is submerged in the liquid L, and the liquid enters the tuyères 2a through central holes 2b, provided in the bottoms 3b thereof. Centrifugally created suction may be depended upon to lift or pump liquid into the tuyères through these openings but it is unnecessary to expend power for that purpose, when it is so much easier to partly submerge the pressure box and thus ensure adequate liquid feed through the bottoms of the tuyères.

The aerated water is discharged through a slot or port 7b, at the bottom of the separator 7a, and is carried away by a duct 12a. So far as the essential operation is concerned, the apparatus of Fig. 5 operates identically as before described.

In Fig. 5, T' represents the end of a sedimentation tank in which water is maintained at a level WL'' and, as before, it is desirable that a by-pass or overflow be provided for service when the level WL'', is arbitrarily raised. Therefore, the end of the tank is provided with an opening 27, visible beneath the air trunk 25—26, and that opening presents a level lower edge which forms an emergency outfall weir 28'.

Fig. 4 illustrates a tuyère much like those shown in Figs. 1, 2 and 5, but of less height, and also having an imperforate cylindrical portion 4a, which is of less diameter than the body of the tuyère. In such top construction an overhanging shoulder 29 is provided between the tuyère openings and the part 4a, and serves to arbitrarily increase the thickness of the foraminous wall formed by the air sustained whirling particles of water within the tuyère.

Fig. 4 also depicts an ultra-violet lamp 30, which is installed axially within the tuyère and is there operated to annihilate bacteria that are exposed in the manner before described.

The importance of the present invention is well illustrated or explained by the results thus far obtained. Raw sewage, merely screened, has been operated upon as herein described and, though carrying a heavy burden of putrecible matter, has remained stable for fully ten days; a period much longer than ever before reported; and most remarkable when it is realized that such stability was imparted in so brief a time of passage, little if any more than one second. The same sewage, when diluted, has remained stable for much longer periods and likewise sewage which had been settled or prepurified.

Furthermore, in these cases the solids have been so far maintained in or restored to a healthful state that they have been avidly eaten by fish with no apparent injury to the fish; and delicate water plants immersed in quantities of thus aerated sewage thrive much as though submerged in potable water.

It is to be noted that the whole process is conducted in open air and at atmospheric temperature.

As will be apparent, the output of the aerator, here employed at the outlet of a primary sedimentation tank, may be directed into a secondary sedimentation tank for further clarification. Such secondary tank should be provided with means for removing setled sludge; whatever its nature; as in the case of the described primary tank.

Hereinunder the simplest sewage disposal system will consist in screening raw sewage (screenings to be later disposed of) and then purging and aerating the sewage as here described, to condition it for dilution.

A better system will provide for screening the sewage, for sedimentation, and removal of scums and sludges, followed by the described purging and aerating operation.

A still better system may introduce aeration immediately after the screening of the raw sewage to allow of protracted sedimentation without fear of putrefaction and with assurance of obtaining "fresh" sludge.

A complete system hereunder will comprise a screening, purging and aerating operation; sedimentation; removal of sludges and scum; the utilization or destruction of both; the re-aeration of the thus purified sewage, and the sedimentation of the re-aerated sewage in advance of its dilution.

Because the herein described stabilizing apparatus may be employed in arts other than the treatment of sewage, it is herein claimed as a structure capable of such other uses.

In the foregoing discussion of the treatment of sewage, emphasis has been laid upon the importance of the oxygen which is derivable from air. The nitrogen of air has been virtually disregarded because its part in the chemistry involved is not well defined. Nevertheless, it may be found to play an important part in the stabilization of sewage, either at the instant of application, or at a later time.

I claim:

Subjecting liquid sewage in an atomized state to a whirling current of air in a confined space and resolving the atomized liquid while still confined into a mass under the influence of said current of air.

CHARLES GILBERT HAWLEY.